Patented May 6, 1930

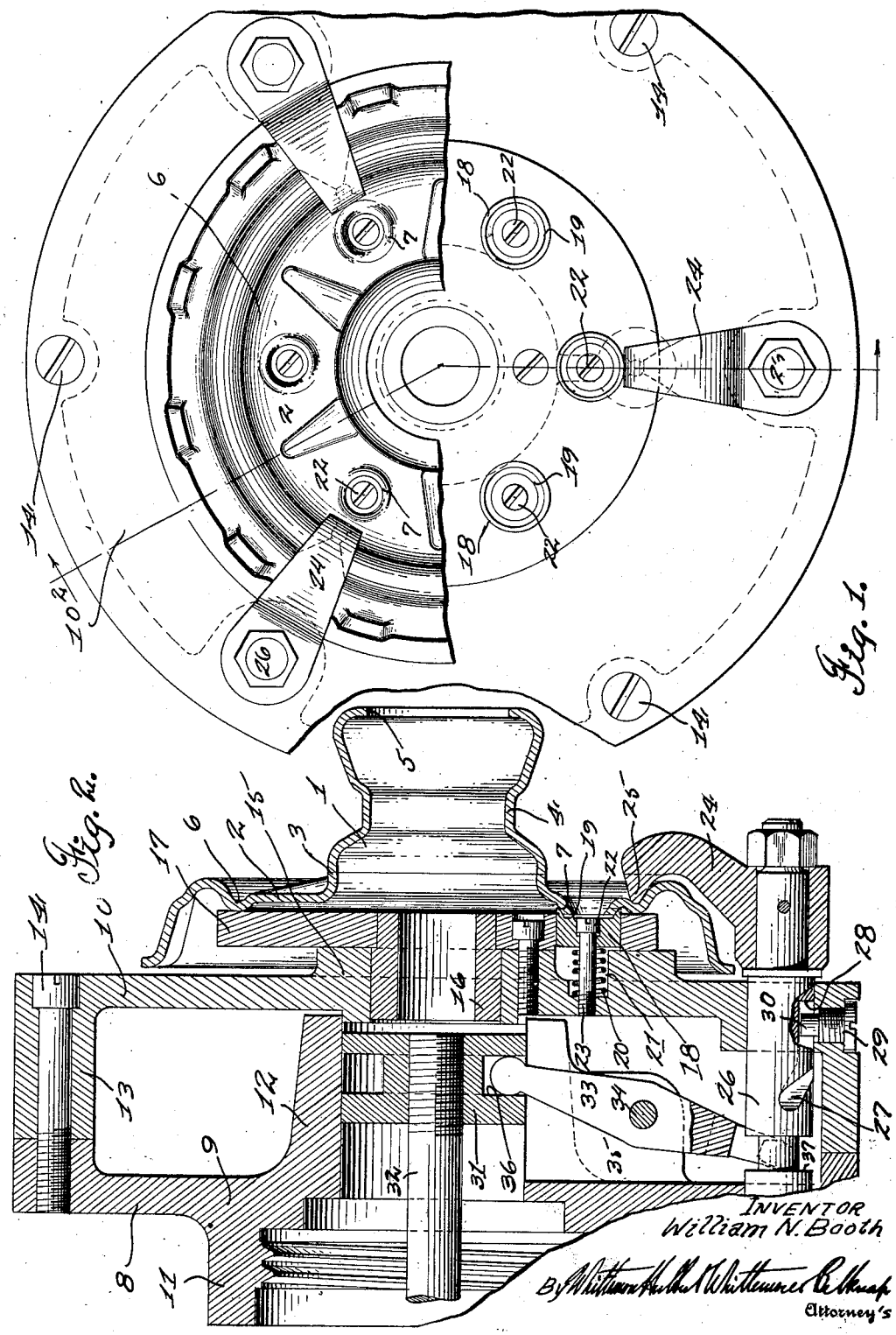

1,756,970

UNITED STATES PATENT OFFICE

WILLIAM N. BOOTH, OF DETROIT, MICHIGAN, ASSIGNOR TO KELSEY-HAYS WHEEL CORPORATION, OF DETROIT, MICHIGAN, A CORPORATION OF NEW YORK

WORK CHUCK

Application filed May 23, 1927. Serial No. 193,692.

The invention relates to work chucks and refers more particularly to chucks for hub shells of vehicle wire wheels. One of the objects of the invention is to so construct the chuck that the work may be readily and quickly secured and removed. Another object is to so construct the chuck that the work will be accurately positioned in the chuck. Further objects of the invention reside in the novel features of construction and combinations and arrangements of parts as more fully hereinafter set forth.

In the drawings:—

Figure 1 is an end view partly broken away of a chuck embodying my invention;

Figure 2 is a cross section on the line 2—2 of Figure 1.

The chuck shown in the present instance is designed particularly for sheet metal hub shells of vehicle wire wheels. These hub shells each have the barrel 1 and the radially extending flange 2 preferably secured to each other by welding their adjacent edges at 3. The barrel has the annular depression 4 intermediate its ends and the central opening 5 at its front end and the flange has the annular rib 6 and the inwardly spaced transverse tubular driving projections 7, which are preferably tapered.

8 is the head of the chuck comprising the body 9 and the cover 10. The body 9 has the hub 11 which is suitably secured to a tubular driving spindle, and the concentric boss 12, the latter extending toward the cover and terminating adjacent thereto. The cover has the annular peripheral flange 13 abutting the body 9 near its periphery and secured thereto as by means of the bolts 14. The cover also has the axial hub 15 which extends slightly into the boss 12. 16 is a bushing concentrically mounted within the hub 15 and extending in front thereof and carrying the abutment plate 17, the front face of which is adapted to engage the rear face of the annular rib 6 of the hub shell.

For accurately positioning the hub shell with its axis in alignment with the axis of the chuck head, I have provided the locating blocks 18 corresponding in number to the tubular driving projections 7 of the hub shell and slidably mounted in the abutment plate 17. The front faces of these locating blocks are provided with the recesses 19 having flared walls for fitting the outer faces of the driving projections. 20 are coil springs extending into recesses 21 in the cover 10 and abutting at their rear ends the cover and at their front ends the locating blocks to yieldably force these locating blocks forwardly and to normally hold the same in predetermined position controlled by the heads 22 of the screws 23 extending through the locating blocks and threaded into the cover.

For clamping the hub shell against the abutment plate 17, I have provided the clamps 24 which have the noses 25 engageable with the front face of the annular rib 6. Each of these clamps is fixedly secured to a rod 26 which is slidably mounted in the body 9 and cover 10 near their outer edges. Each rod 26 is provided with a cam groove having the portion 27 which is inclined relative to the axis of the rod, or spirally arranged, and the portion 28 which extends parallel to the axis of the rod. 29 is a screw threaded in the flange 13 of the cover and having the reduced end 30 engageable in the cam groove. The arrangement of the cam groove in each rod and the screw engaging in the cam groove provides upon longitudinal movement of the rod for rotation thereof while the screw engages the portion 27 of the cam groove and rectilinear movement of the rod while the screw engages the portion 28 of the cam groove. The amount of rotation is such that the cam secured to the rod is swung either from a position registering with the annular rib 6 of the hub shell to a position clearing the flange 2 of the hub shell or vice versa, and as a result the hub shell may be readily and quickly applied or removed by longitudinally moving the rods.

For simultaneously moving the rods 26 longitudinally, I have provided the reciprocable collar 31 which is slidably mounted in the boss 12 of the body and is connected to the piston of an air cylinder by the piston rod 32, which is adapted to extend axially through the tubular driving spindle. I have also provided the levers 33 which are pivotally mounted intermediate their ends at 34 upon bifurcations 35 of the body and located in the space enclosed by the body and cover. These levers extend through slots in the boss 12 and their inner ends engage in the annular groove 36 of the collar 31 while their outer ends engage in the annular grooves 37 in the rods 26. The levers are also located within the space between the body and cover of the chuck head.

In operation and assuming the clamps to be in position clearing the flange 2 of the hub shell, air is turned into the air cylinder and the collar 31 is moved forwardly in the boss 12 and in so doing swings the levers 33 to longitudinally move the rods 26 rearwardly. During the first portion of their rearward movement, the pins 29 engaging in the portions 27 of the cam grooves compel the rods to rotate and to swing the clamps to a position registering with the annular bead 6 of the hub shell. Then when the pins engage in the portions 28 of the cam grooves the rods move rectilinearly and in so doing carry the clamps toward the abutment plate 17 to engage the outer face of the annular bead of the hub shell to clamp the same against the abutment plate. Prior to the engagement of the clamps with the hub shell the hub shell is positioned with its tubular driving projections in engagement with the locating blocks 18 so that as a result when the hub shell is clamped against the abutment plate it will also be accurately positioned in the chuck, so that the inner face of the annular depression 4, the edge of the opening 5, and the external flash of the weld may be accurately machined.

What I claim as my invention is:

1. In a work chuck, the combination with a head, of means upon said head for clamping the work thereto, including a clamp adapted to swing from a position clearing the work to a position registering with the work and also adapted to move toward said head into clamping engagement with the work, a rod upon said head and carrying said clamp and provided with a cam groove having a portion inclined relative to its axis, a reciprocable member and a lever pivotally mounted upon said head for connecting said reciprocable member to said rod to longitudinally move the latter upon movement of the former.

2. In a work chuck, the combination with a head, of means carried by said head for clamping the work thereto, including a clamp movable to positions clearing or registering with the work and also movable toward said head into clamping engagement with the work, locating members slidably mounted upon said head and having recesses engageable by the work, and springs for yieldably holding said locating members in a predetermined position relative to said head.

3. In a chuck for a hub shell having a radially extending flange with transverse tubular driving projections, the combination with a head comprising a body and a cover secured thereto, of means carried by said head for clamping the hub shell to said cover, including a clamp adapted to swing to positions clearing or registering with the radially extending flange of the hub shell and also adapted to move toward said cover into clamping engagement with the radially extending flange, locating blocks slidably mounted upon said cover and provided with recesses for engaging the tubular driving projections of the hub shell, and coil springs for yieldably holding said locating blocks in a predetermined position.

4. In a work chuck, the combination with a head having a tubular projection, of means upon said head for clamping the work thereto, including a clamp adapted to swing from a position clearing the work to a position registering with the work and also adapted to move toward said head into clamping engagement with the work, a longitudinally movable and rotatable rod upon said head for actuating the clamp, means for actuating said rod including a member slidably arranged within said tubular projection and having an annular groove in the periphery thereof, and a lever pivotally mounted upon said head having one end arranged within said groove and the opposite end connected to said rod.

5. In a work chuck, the combination with a head having a boss, of means upon said head for clamping the work thereto including a rotatable and axially movable clamp, a longitudinally movable and rotatable rod upon said head for actuating said clamp, a member slidably arranged within said boss, and a lever pivotally mounted upon said head and connected to said rod and member within said boss.

6. In a work chuck, the combination with a head, of means upon the head for clamping the work thereto including an axially movable clamp adapted to swing from a position clearing the work to a position registering with the work, a longitudinally movable and rotatable rod upon said head for actuating the clamp, a member mounted for slidable movement relative to the head, a lever pivotally mounted intermediate the ends thereof to said head and having one end engageable with the member aforesaid and the opposite end engageable with said rod for longitudinally moving the same, and means also engageable with said rod for rotating the latter to swing the clamp relative to the work during the longitudinal movement of the rod.

In testimony whereof I affix my signature.

WILLIAM N. BOOTH.